3,180,869
2-ALKYL-4,7-DIAMINO-6-PTERIDINE-
CARBOXAMIDES
Thomas S. Osdene, West Chester, Pa., assignor to American Home Products Corporation, New York, N.Y., a corporation of Delaware
No Drawing. Filed Dec. 3, 1962, Ser. No. 241,490
6 Claims. (Cl. 260—251.5)

The present invention relates to novel pteridinecarboxamides and to a process for the production thereof.

More particularly, the present invention relates to 2-alkyl-4,7-diamino-6-pteridinecarboxamides.

The novel compounds made available by the present invention are represented by the following general formula:

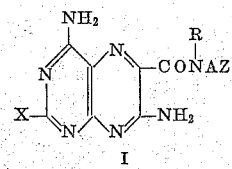

I

In the above formula, X represents a lower alkyl group, having from 1 to 3 carbon atoms, or a lower haloalkyl group; R represents hydrogen or a lower alkyl group having from 1 to 4 carbon atoms; AZ together may represent hydrogen or A may separately stand for a straight chain or a branched alkylene group having from 2 to 5 carbon atoms while Z separately stands for a di-lower alkylamino radical in which the alkyl radicals may have from 1 to 4 carbon atoms; or a pyrrolidinyl, piperidinyl, morpholinyl or piperazinyl radical.

The novel compounds of the present invention suitably are prepared by the process illustrated by the following equation:

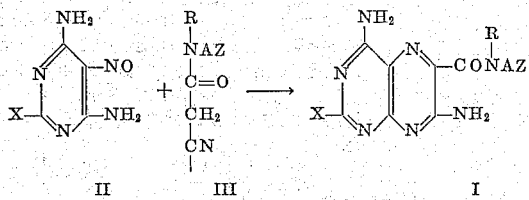

In the above formulas, A, R, X and Z have the same meaning previously set forth.

In practicing the process outlined above, the starting 4,6-diamino-2-substituted-5-nitrosopyrimidine (II) is heated in an anhydrous neutral polar solvent in the presence of a catalytic amount of a basic catalyst with approximately equimolar amounts of a 2-cyano-N-substituted-acetamide (III).

Useful neutral polar solvents for this reaction are methanol, propanol, ethanol, butanol, glycol ethers such as 2-methoxy ethanol, 2-ethoxy ethanol, methoxy and ethoxy propanols and amides such as dimethylformamide, diethylformamide and dimethyl acetamide. Suitable basic catalysts for promoting the reaction include the alkali metals, their alkoxides and their alkoxy alkoxides. Preferred among these is sodium alpha-ethoxy ethoxide. The reaction temperatures range from about 60° to 200° C. and the reaction is preferably conducted at or autogenous the boiling point of the selected solvent and under autogenous pressure. The product is purified preferably by dissolving it in aqueous ethanol or dimethyl formamide.

The following examples, in which all temperatures are in degrees centigrade, illustrate the best mode of carrying out the invention:

Example 1

To a solution of 61.25 g. of butyramidine hydrochloride in 300 ml. of methanol was added 122 g. of the silver salt of isonitrosomalononitrile in small portions with stirring. The mixture was stirred for 2 hours at ambient temperature and then was filtered by suction. The filtrate was evaporated to dryness on a rotary evaporator to give the yellow butyramidine salt of isonitrosomalononitrile, M.P. 86.5–87.5°.

Five grams of the above amidine salt was boiled under reflux with 30 ml. of 2-methyl-5-ethylpyridine for 10 mins., when the solution darkened and crystals were deposited. On cooling, there was obtained 3.3 g. of material, M.P. 229–230° (decomposition). Recrystallization from ethanol afforded 4,6-diamino-5-nitroso-2-n-propyl-pyrimidine, M.P. 231.5° (decomposition).

Analysis.—Calculated: C=46.45, H=6.11, N=38.69. Found: C=46.74, H=6.08, N=38.86.

Example 2

To a solution of 24.5 of g. of trifluoroacetamidine hydrochloride in 450 ml. of absolute ethanol was added portionwise 33.6 g. of the silver salt of isonitrosomalononitrile with stirring. The mixture was stirred for 2 hrs. and the silver chloride was removed by filtration. The filtrate was evaporated to dryness to give the trifluoroacetamidine salt of isonitrosomalononitrile, M.P. 95–96°.

The material thus obtained was dissolved in 150 ml. of dimethylformamide and boiled under reflux for 10 mins. Addition of an excess of water precipitated a dark green powder. Recrystallization from aqueous dimethylformamide, followed by a recrystallization from aqueous acetic acid gave 4,6-diamino-5-nitroso-2-trifluoromethylpyrimidine, as a light green powder, M.P.>360°.

Analysis.—Calculated: C=29.01, H=1.95. Found: C=28.55, H=2.16.

Example 3

To a solution of 0.2 g. of sodium in 400 ml. of dried 2-ethoxyethanol was added 4.6 g. of 4,6-diamino-2-methyl-5-nitrosopyrimidine and 6.5 g. of 2-cyano-N-(3-diethylaminopropyl)acetamide. The mixture was boiled under reflux for 2 hrs., and then the hot solution was filtered by gravity. The filtrated was taken to dryness on a rotary evaporator and the dark residue was triturated with 100 ml. of water to give a brown solid, M.P. 245°. Several recrystallizations from ethanol afforded 4,7-diamino-N-(3-diethylaminopropyl)-2-methyl - 6 - pteridine-carboxamide, M.P. 250°, as slightly hygroscopic crystals.

Analysis.—Calculated: C=54.20, H=7.28, N=33.71. Found: C=53.49, H=7.65, N=33.80.

Example 4

To a solution of 0.2 g. of sodium in 125 ml. of dried 2-ethoxyethanol was added 2.07 g. of 4,6-diamino-5-nitroso-2-trifluoromethylpyrimidine and the mixture was stirred and boiled under reflux. When a green solution was obtained, there was added 2.0 g. of 2-cyano-N-(2-diethylaminoethyl)acetamide and refluxing was continued for 15 mins. During this time the color of the solution changed from green to yellow. The solvent was removed on a rotary evaporator and the residue was triturated with 50 ml. of water to give a yellow material, wt.=2.25 g., M.P. 318–320° (decomposition). Recrystallization from ethanol afforded 4,7-diamino-N-(2-diethylaminoethyl)-2-trifluoromethyl-6-pteridinecarboxamide, M.P. 327–330° (decomposition).

*Analysis.*—Calculated: C=45.16, H=5.14, N=30.10, F=15.31. Found: C=44.88, H=5.01, N=29.88, F=15.40.

Example 5

To a solution of 0.2 g. of sodium in 100 ml. of dried 2-ethoxyethanol was added 2.07 g. of 4,6-diamino-5-nitroso-2-trifluoromethylpyrimidine followed by 1.0 g. of cyanoacetamide. The mixture was stirred mechanically and boiled under reflux for 30 mins. During this time the color changed from green to yellow with brown, and a little ppt. was deposited. After filtration, the solution was evaporated to dryness on a rotary evaporator and the residue was triturated with 50 ml. of water when a yellow solid was obtained, wt.=2.0 g., M.P. >360°. Recrystallization from ethanol afforded 4,7-diamino-2-trifluoromethyl-6-pteridinecarboxamide, M.P. >360°.

*Analysis.*—Calculated: C=35.17, H=2.21, N=35.90, F=20.86. Found: C=35.39, H=2.39, N=35.67, F=20.90.

Example 6

To a solution of 0.2 g. of sodium in 500 ml. of absolute ethanol was added 5.43 g. of 4,6-diamino-5-nitroso-2-n-propylpyrimidine followed by 3.0 g. of cyanoacetamide. The mixture was stirred and boiled under reflux for 30 mins. during which time a precipitate was deposited out of solution. On cooling this was removed by filtration to give material, wt.=3.6 g., M.P. >360°. Concentration of the mother liquor yielded a further 2.6 g. of identical material. The combined material was recrysallized from aqueous dimethylforamide to give 4,7-diamino-2-n-propyl-6-pteridinecarboxamide, M.P. >360°.

*Analysis.*—Calculated: C=48.57, H=5.29, N=39.65. Found: C=48.43, H=5.11, N=39.46.

Example 7

To a solution of 0.2 g. of sodium in 500 ml. of ethanol was added 5.43 g. of 4,6-diamino-5-nitroso-2-n-propylpyrimidine and the mixture was stirred and brought to boiling point. Following this there was added 6.50 g. of 2-cyano-N-(3-diethylaminopropyl)acetamide and the mixture was boiled under reflux for 30 mins. The color of the solution changed from green to brown. The solvent was removed on a rotary evaporator and the residue was treated with 100 ml. of water. There was obtained 8.0 g. of a solid, M.P. 236–237° d. Recrystallization from aqueous ethanol afforded 4,7-diamino-N-(3-diethylaminopropyl)-2-n-propyl-6-pteridinecarboxamide, hemihydrate, M.P. 244–245° (decomposition).

*Analysis.*—Calculated: C=55.26, H=7.91. Found: C=55.08, 55.34; H=8.04, 8.11

Example 8

To a solution of 0.2 g. of sodium in 500 ml. of absolute ethanol was added 5.43 g. of 4,6-diamino-5-nitroso-2-n-propylpyrimidine, followed by 6.04 g. of 2-cyano-N-(2-diethylaminoethyl)acetamide. The mixture was stirred and boiled under reflux for 30 mins. After cooling, the solution was concentrated to small bulk at which time a precipitate was deposited. This was removed by filtration and had an M.P. of 259–262° (decomposition). Several recrystallizations from aqueous dimethylformamide, followed by a crystallization from aqueous ethanol afforded 4,7-diamino-N-(2-diethylaminoethyl)-2-n-propyl-6-pteridinecarboxamide, hemihydrate, M.P. 266° (decomposition).

*Analysis.*—Calculated: C=54.07, H=7.65, N=31.53. Found: C=54.50, H=7.48, N=31.74.

The starting compounds listed below are treated following the above procedure to give the corresponding products hereinafter set forth:

| Starting Compounds | Products |
|---|---|
| 4,6-diamino-2-methyl-5-nitrosopyrimidine and 2-cyano-N-(2-morpholinoethyl)acetamide. | 4,7-diamino-2-methyl-N-(2-morpholinoethyl)-6-pteridinecarboxamide. |
| 4,6-diamino-5-nitroso-2-trifluoromethylpyrimidine and 2-cyano-N-(ethyl-2-dimethylaminoethyl)acetamide. | 4,7-diamino-N-(ethyl-2-dimethylaminoethyl)-2-trifluoromethyl-6-pteridinecarboxamide. |
| 4,6-diamino-5-nitroso-2-n-propylpyrimidine and 2-cyano-N-(2-piperidinoethyl)acetamide. | 4,7-diamino-N-(2-piperidinoethyl)-2-n-propyl-6-pteridinecarboxamide. |
| 4,6-diamino-2-methyl-5-nitrosopyrimidine and 2-cyano-N-(3-di-n-butylaminopropyl)acetamide. | 4,7-diamino-N-(3-di-n-butylaminopropyl)-2-methyl-6-pteridinecarboxamide. |
| 4,6-diamino-5-nitroso-2-n-propylpyrimidine and 2-cyano-N-(methyl)acetamide. | 4,7-diamino-N-(methyl)-2-n-propyl-6-pteridinecarboxamide. |
| 4,6-diamino-5-nitroso-2-n-propylpyrimidine and 2-cyano-N-(butyl-5-dibutylaminopentyl)acetamide. | 4,7-diamino-N-(butyl-5-dibutylaminopentyl)-2-n-propyl-6-pteridinecarboxamide. |
| 4,6-diamino-5-nitroso-2-ethylpyrimidine and 2-cyano-N-(propyl-4-pyrrolidinobutyl)acetamide. | 4,7-diamino-N-(propyl-4-pyrrolidinobutyl)-2-ethyl-6-pteridinecarboxamide. |

The novel compounds of this invention are useful in experimental pharmacology and exhibit antiviral activity; in particular, against Columbia SK polio organisms.

The novel compounds of Formula I can be administered in a wide variety of oral or parenteral forms, alone, or in admixture with other active compounds. They can be associated with a pharmaceutical carrier which can be a solid or a liquid in which the compound is dissolved or suspended. The solid compositions can take the form of tablets, powders, capsules or pills. The liquid compositions can take the form of solutions, syrups, or emulsions.

What is claimed is:
1. A compound of the formula:

$$\begin{array}{c} NH_2 \\ | \\ \text{[pteridine ring]} \end{array} \quad \begin{array}{c} R \\ | \\ -CONAZ \end{array}$$

$$X- \qquad -NH_2$$

wherein X is selected from the group of lower alkyl having from 1 to 3 carbon atoms in the alkyl chain and trifluoromethyl, R is selected from the group of hydrogen and lower alkyl having up to 4 carbon atoms, A is selected from the group consisting of the straight chained alkylene and branched alkylene having from 2 to 5 carbon atoms, Z is selected from the group consisting of di-lower alkylamino, pyrrolidino, piperidino, morpholino and piperazino and when X is trifluoromethyl AZ taken together is hydrogen.

2. 4,7 - diamino - N - (3 - diethylaminopropyl) - 2-methyl-6-pteridinecarboxamide.

3. 4,7 - diamino - N-(2-diethylaminoethyl)-2-trifluoromethyl-6-pteridinecarboxamide.

4. 4,7 - diamino - 2-trifluoromethyl-6-pteridinecarboxamide.

5. 4,7 - diamino - N - (3-diethylaminopropyl)-2-n-propyl-6-pteridinecarboxamide.

6. 4,7 - diamino - N-(2-diethylaminoethyl) - 2 - n-propyl-6-pteridinecarboxamide.

References Cited by the Examiner
UNITED STATES PATENTS
2,940,972  660  Roch _____ 260—251.5

OTHER REFERENCES
Osdene et al.: J. Chem. Soc., London (1955), pages 2036–38.

IRVING MARCUS, *Primary Examiner.*

DUVAL T. McCUTCHEN, WALTER A. MODANCE, *Examiners.*